United States Patent
Aebli et al.

[11] 3,821,240
[45] June 28, 1974

[54] BIS-TRIAZOLE COMPOUNDS

[75] Inventors: Horst Aebli, Basle; Fritz Fleck, Bottmingen; Hans Kittl, Riehen; Horst Schmid, Munchenstein, all of Switzerland

[73] Assignee: Sandoz Ltd., Basle, Switzerland

[22] Filed: Dec. 28, 1971

[21] Appl. No.: 213,162

[30] Foreign Application Priority Data
Dec. 31, 1970 Switzerland.......................... 19360/70
Jan. 14, 1971 Switzerland............................ 597/71

[52] U.S. Cl. ..................... 260/307 D, 252/301.2 W
[51] Int. Cl............................................. C07d 85/48
[58] Field of Search................................. 260/307 D

[56] References Cited
UNITED STATES PATENTS
3,689,425  9/1972  Crounse.............................. 252/117

Primary Examiner—Donald G. Daus
Assistant Examiner—Raymond V. Rush
Attorney, Agent, or Firm—Gerald D. Sharkin; Richard E. Vila; Thomas C. Doyle

[57] ABSTRACT

Bis-triazole compounds of formula

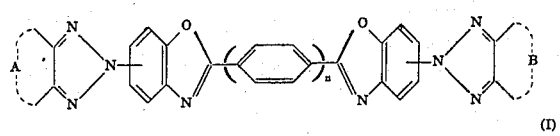

(I)

where
A and B each stands for the atoms or groups of atoms necessary for the formation of dihydrated derivatives of aromatic carbocycles or heterocycles which may bear non-ionic substituents
and $n$ has a value from 1 to 6, e.g., 1,4-bis-[6'-naphthotriazolyl-(2'')-benzoxazolyl-2']-benzene, which are eminently suitable as optical brighteners for organic materials especially plastics, giving very fast optical brightenings.

8 Claims, No Drawings

BIS-TRIAZOLE COMPOUNDS

This invention relates to new bis-triazole compounds of formula

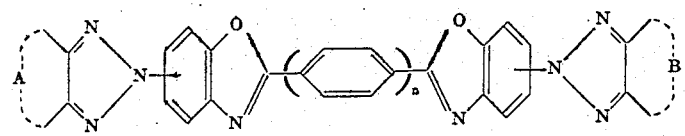

(I)

where
A and B each stands for the atoms or groups of atoms necessary for the formation of dihydrated derivatives of aromatic carbocycles or heterocycles which may bear non-ionic substituents
and $n$ has a value from 1 to 6.

The bis-triazole compounds of formula (I) can be synthesized by tetrazotization of a diamine of formula

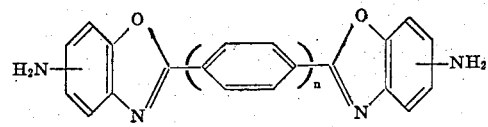

(II)

coupling of the resulting tetrazonium salt with primary aromatic carbocyclic or heterocyclic amines which couple in the vicinal position to the amino group, and oxidation of the resulting bis-(ortho-aminoazo) compound to a bis-triazole compound of formula (I); or by esterification in either order of 1 mol of an aromatic dicarboxylic acid of formula

(III)

or one of its functional derivatives, with 1 mol of an ortho-nitrophenol of formula

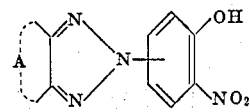

(IV)

and 1 mol of an ortho-nitrophenol of formula

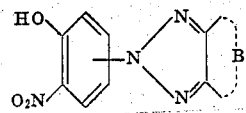

(V)

to bis-(ortho-nitrophenyl)-esters of formula

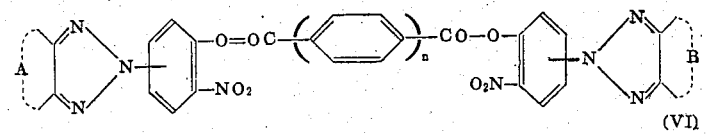

(VI)

followed by reduction and condensation of the esters to bis-triazole compounds of formula (I); or by acylation in either order of 1 mol of an ortho-aminophenol of formula

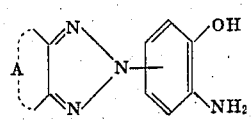

(VII)

and 1 mol of an ortho-aminophenol of formula

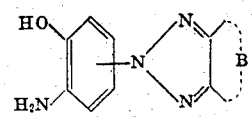

(VIII)

with 1 mol of an aromatic dicarboxylic acid of formula (III) or of one of its functional derivatives, with subsequent condensation;
or by acylation in either order of 1 mol of an ortho-aminohalogenobenzene of formula

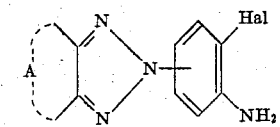

(IX)

and 1 mol of an ortho-aminohalogenobenzene of formula

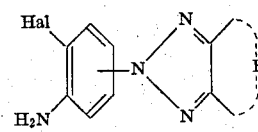

(X), where Hal stands for chlorine or preferably bromine, with 1 mol of an aromatic dicarboxylic acid of formula (III) or one of its functional derivatives, with subsequent condensation in the presence of copper or a copper compound; or by reaction with suitable metals of 1 mol of a triazole compound of formula

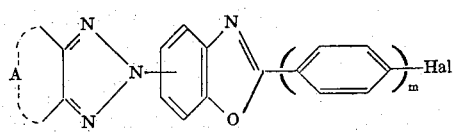

(XI)

and 1 mol of a triazole compound of formula

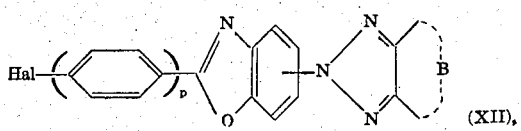

(XII), where
Hal stands for chlorine, bromine or preferably iodine, $m$ for a whole number from 1 to 5,
$p$ for a whole number from 1 to 5,
and where the sum of $m$ and $p$ has a value from 2 to 6.

The new bis-triazole compounds of formula (I) may have a symmetrical structure (with A and B identical) or an asymmetrical structure (with A and B different from each other). The anellated 1,2,3-triazole radicals are bound through their N-2 nitrogen atoms, preferably to the 5 and 6 positions of the benzoxazolyl nuclei.

The benzoxazolyl nuclei, as shown in formula (I), are bound to each other through their C-2 carbon atoms by at least one 1,4-phenylene radical.

If several, e.g. 2 to 6, phenylene nuclei are present as bridge members, they are bound to each other solely through the 1,4 positions.

The bis-(aminobenzoxazolyl)-phenylenes of formula (II) used as starting materials for the production of the new bis-triazoles of formula (I) are in part known, i.e. those in which n has the value 1 (cf. J. Preston et al, Journal of Heterocyclic Chemistry 5, (2), 269 (1958)). The higher homologues in which n has a value from 2 to 6 can be produced in an analogous manner by condensation of the corresponding dicarboxylic acids with 2,4- or 2,5-diaminophenols or with their dihydrochlorides in the presence of polyphosphoric acid at about 200°C.

The diamines of formula (II) are tetrazotized by the known methods in aqueous suspension or in aqueous-organic medium, for example in a mixture of water and glycols (ethylene glycol, propylene glycol, diethylene glycol), alcohol ethers, [2-ethoxyethanol, 2-methoxyethanol, 2-n-butoxyethanol, 2-(2'-methoxyethoxy)-ethanol], ethers (dioxan, 1,2-dimethoxyethane), amides [dimethyl formamide, dimethyl acetamide, phosphoric acid tris-(dimethylamide)], sulphones (tetramethylene sulphone), by reaction with an alkali or alkaline-earth nitrate in the presence of mineral acids at temperatures in the range of −10°C to +20°C, preferably at 0°–10°C.

The reaction with the coupling component can be carried out after isolation of the tetrazonium salt or preferably without isolation of the salt by adding the coupling component and neutralizing the excess acid in the mixture, for example with an alkali-metal hydroxide, carbonate or acetate, a tertiary nitrogen base such as pyridine or one of its homologues, at 0° to 60°C, preferably 20° to 60°C. The reaction is carried out in the acid pH region, preferably at pH 2 to 4, and if necessary a coupling accelerant such as pyridine or urea may be used. If the coupling component is one bearing a sulphonic acid group which is bound directly or through a —$CH_2$— group to the coupling position or to the amino group, the sulphonic acid or —$CH_2$—$SO_3H$ group is split off in the reaction.

The following are examples of suitable coupling components: aminobenzenes, e.g. 1-amino-3,4-dimethylbenzene, 1-amino-4-methyl-5-methoxybenzene, 1-amino-4-methyl-5-n-butoxybenzene, 1-amino-4-chloro-5-methoxybenzene, 1-amino-4-chloro-5-n-butoxybenzene, 1-amino-4,5-dimethoxybenzene, 4,4'-diamino2,2'-dimethoxydiphenyl; diaminobenzenes, e.g. 1,3-diaminobenzene, 1,3-diamino-4-methylbenzene, 1,3-diamino-4-methoxybenzene, 1,3-diamino-4-chlorobenzene; aminonaphthalenes, e.g. 2-aminonaphthalene, 2-amino-5-methoxynaphthalene, 2-amino-6-methoxynaphthalene, 2-amino-7-methoxynaphthalene, 1-amino-4-methylnaphthalene, 1-amino-4-methoxynaphthalene, 1-amino-5,8-dichloronaphthalene, 1-amino-5-methylsulphonylnaphthalene, 1-aminonaphthalene-5-sulphonic acid dimethylamide; their derivatives bearing sulphonic acid groups, e.g. 2-aminonaphthalene-1-sulphonic acid, naphthyl-2-sulphamic acid, naphthyl-2-aminomethyl-sulphonic acid; aminoacenaphthenes, e.g. 4-aminoacenaphthene, 5-aminoacenaphthene, 6-chloro-5-aminoacenaphthene, 6-methoxy-5-aminoacenaphthene; aminophenanthrenes, e.g. 9-aminophenanthrene; aminobenzotriazoles, e.g. 2-phenyl-5-(6)-aminobenzotriazole, 2-naphthyl-5(6)-aminobenzotriazole, 2-(4'-chlorophenyl)-5-aminobenzotriazole, 2-(4'-methylphenyl)-5-aminobenzotriazole, 2-(4'-cyanophenyl)-5-aminobenzotriazole, 2-(4'-methoxyphenyl)-5-aminobenzotriazole, 2-phenyl-6-chloro- and -6-bromo-5-aminobenzotriazole, 2-phenyl-6-($C_1$-$C_4$-alkyl)-5-aminobenzotriazole, 2 -phenyl-6-($C_1$-$C_4$-alkoxy)-5-aminobenzotriazole; aminopyrazoles, e.g. 1-phenyl-3-methyl-5-aminopyrazole, 1-(4'-chlorophenyl)-3-methyl-5-aminopyrazole, 1-(4'-methylphenyl)-3-methyl-5-aminopyrazole; aminoindazoles, e.g. 6-aminoindazole, 5-aminoindazole, etc.

In comparison with the corresponding compounds free from sulphonic acid groups, the coupling components bearing one sulphonic acid group which is split off in the coupling reaction have the advantage of being soluble in water in the form of the alkali-metal or ammonium salts and of being physiologically less hazardous.

If a polyamine is chosen as coupling component, after the bisazo compound formed has been converted into the triazole compound it is advisable to acylate the remaining amino groups or to remove these groups by diazotization and subsequent boiling in the presence of a reducing agent such as hypophosphorus acid, a salt of this acid or an alcohol such as ethanol; the diazotized amino groups can if desired be replaced by non-ionic substituents.

As the bis-ortho-aminoazo compounds are insoluble in water, they are best oxidized in the presence of oxidation stable organic solvents, for example pyridine, mixtures of pyridine bases, halogenated hydrocarbons, e.g. chlorobenzene or more highly chlorinated benzenes.

The suitable oxidizing agents include alkali hypohalogenites such as sodium hypobromite, potassium hypochlorite, lithium hypochlorite, chloride of lime and in particular sodium hypochlorite, cupric salt complexes of inorganic or organic cupric salts such as copper (II) sulphate, chloride, carbonate, acetate and naphthenate, etc. and nitrogenous bases, e.g. ammonia, amines and pyridines etc. The reaction is carried out expediently at temperatures ranging from 0° to 150°C, e.g. at 0° to 50°C or preferably 20° to 40°C when alkali hypohalogenites are used, or at 20° to 150°C, preferably 60° to 110°C, when copper compounds are used.

A further method of producing symmetrical or asymmetrical bis-triazoles of formula (I) consists in reducing and condensing the corresponding triazolated bis-ortho-nitrophenylesters of formula (VI) by treatment with a reducing agent which splits off water, preferably a mixture of stannous chloride and hydrochloric acid, in the temperature range of 20° to 150°C, preferably at 70° to 130°C. The reaction is effected expediently in the presence of an organic solvent, e.g. an alcohol or an alkoxyethanol.

The triazolated bis-ortho-nitrophenylesters of formula (VI) used for the formation of compounds of formula (I) with a symmetrical structure (i.e. in which A and B have the same meaning) are prepared by reaction of an aromatic dicarboxylic acid of formula (III) or one of its functional derivatives with a triazolated ortho-nitrophenol of formula (IV) or (V) in the molar ratio of 1:2, i.e. 1 mol of compound (III) to 2 mols of compound (IV) of (V), or in a ratio deviating only slightly from this.

The choice of functional derivatives of aromatic dicarboxylic acids of formula (III) includes the dinitriles, diamides, diesters, e.g. the dimethyl and diethylesters, and the dihalides, notably the dichlorides, monoalkylesters such as monomethyl and monoethyl ester, and monoalkyl ester halides, e.g. monomethyl and monoethyl ester halides, in particular monomethyl and monoethyl ester chlorides.

For the synthesis of asymmetrical bis-triazoles of formula (I) in which A and B have different meanings a convenient procedure is to react a triazolated ortho-nitrophenol of formula (IV) or (V) with a monoalkylester halide, e.g. the monomethyl ester or monoethyl ester chloride, of an aromatic dicarboxylic acid of formula (III), and then to cyclize the product with reduction to the oxazole. The resulting condensation product is best hydrolysed to the carboxylic acid, optionally converted into the chloride, then reacted with an ortho-nitrophenol of formula (V) or (IV), reduced and condensed. The three reactants, i.e. the compounds of formulae (III), (IV) and (V), are employed under the aforestated conditions with advantage in the molar ratio of 1:1:1 or in a ratio differing only slightly from this.

The reaction of the ortho-nitrophenols of formulae (IV) or (V) with the decarboxylic acids of formula (III) or their functional derivatives to give the corresponding ortho-nitrophenyl esters of formula (VI) is carried out e.g. in the temperature range of −10° to 200°C. It is of advantage to carry out the reaction in the presence of an inert organic solvent, e.g. one of the aliphatic or aromatic hydrocarbons including the halogenated and nitrated hydrocarbons such as benzine, tetrachloromethane, tetrachloroethane, benzene, toluene, chlorobenzene, 1,2-dichlorobenzene or nitrobenzene, amides such as dimethyl acetamide, phosphoric acid tris-(dimethylamide), or sulphones such as tetramethylene sulphone, and/or to react in the presence of acid-binding agents such as pyridine, mixtures of pyridine bases, quinoline, N,N-dimethyl aminobenzene, N,N-diethyl aminobenzene or tri(n-butyl)-amine. The temperature range for the reaction is advantageously 0° to 120°C, preferably 20° to 115°C. The tertiary amines themselves can serve as reaction medium. If tertiary amines are not present it is advisable to carry out the reaction at 80° to 160°C, preferably at 110° to 130°C.

The Schotten-Baumann method can be employed for conversion into the ortho-nitrophenylesters, in which case the dicarboxylic acid halide is added, either as it is or preferably in solution or suspension in one of the aforenamed solvents, to the strongly alkaline (pH >11, preferably 12–14), aqueous or aqueous-organic solution or suspension of the nitrophenol of formula (IV) or (V) at −5° to 30°C, preferably at 0° to 25°C.

The ortho-nitrophenols of formulae (IV) and (V) used as starting materials can be produced in a simple manner by coupling the corresponding diazotized aminonitrophenols with the aforenamed coupling components and oxidizing the resulting ortho-aminoazo compounds by the aforedescribed method.

Acylation of the ortho-aminophenols of formulae (VII) and (VIII) with the aromatic dicarboxylic acids of formula (III) or their functional derivatives is carried out to best advantage in an organic solvent of high boiling point, e.g. in an alcohol ether [e.g. di- or tri-ethylene glycol, di- or tri-propylene glycol, 2-(2'-methoxyethoxy)-ethanol, 2-(2'-ethoxyethoxy)-ethanol, 2-(2'-n-butoxyethoxy)-ethanol], an ether [e.g. bis-(2-ethoxyethyl)-ether, bis-(2-n-butoxyethyl)-ether], an ester (e.g. dibutyl phthalate), an aromatic hydrocarbon, halogenated or nitrated hydrocarbon (e.g. polyalkylbenzenes having preferably 2 to 5 methyl and/or ethyl groups, diphenyl, diphenyloxide, tetrahydronaphthalene, 1,2-dichlorobenzene, 1,2,4-trichlorobenzene and mixtures of its isomers, nitrobenzene), an amide [e.g. phosphoric acid tris-(dimethylamide) or dimethylacetamide], a sulphone (e.g. tetramethylsulphone), or a mixture of such solvents. The temperature range for this reaction is 0° to 200°C, preferably 0° to 160°C when a carboxylic acid chloride is used for acylation. The condensation reaction is carried out at a higher temperature, e.g. 50° to 350°C or preferably 100° to 280°C, and advantageously in an inert gas such as nitrogen and in the presence of an acid catalyst.

The aforestated temperature ranges 0° to 200°C, 50° to 350°C and 100° to 280°C do not signify that the reaction can always be carried to the end-point at the lower limit value or that the reactants are mixed at the upper limit values, but that they can be mixed at the lower temperature and commence reacting with each other at this temperature.

Examples of suitable acid condensing agents are boric acid, boric anhydride, boron trifluoride, zinc chloride, polyphosphoric acids, aromatic and aliphatic sulphonic acids, e.g. benzenesulphonic, 4-methylbenzenesulphonic, methanesulphonic and ethanesulphonic acid.

To finalize cyclization it is advisable to work at a lower temperature, depending on the catalyst, e.g. at a temperature of at least 100°C when polyphosphoric acids in excess of the theoretical amount are used, e.g. 5 to 10 times the amount by weight relative to the total weight of the reactants. In such cases the polyphosphoric acids serve both as reaction medium and as dehydrating agent.

If the reaction is carried out in the presence of boric acid, zinc chloride or one of the named sulphonic acids as condensing agent, this is best used in catalytic amounts, i.e. in amounts of 0.5–10 % relative to the total weight of the reactants. With smaller amounts, e.g. 0.1 %, the rate of reaction is considerably slower, while amounts greater than 10 % do not result in any appreciable improvement.

If the dicarboxylic acids of formula (III) are used as they are it is advisable to add 0.1 to 1 equivalent of a tertiary saturated nitrogen base per carboxyl group. The suitable bases of this type include tertiary aliphatic amines (trimethylamine, triethylamine, tri-n-butylamine, tri-iso-butylamine), N,N-dialkylaminobenzenes (N,N-dimethylamino- and N,N-diethylaminobenzene), heterocyclic amines (pyridine, the methyl pyridines, quinoline, iso-quinoline, mixtures of pyridine bases, N-methyl-, N-ethyl and N-n-butylpiperidine). It is preferable to use pyridine or mixtures of pyridine bases.

Given the use of dicarboxylic acid halides, the reaction can be carried out in the presence of a tertiary nitrogen base to bind the hydrogen halide formed, and the halide of the tertiary base then removed by suitable means. For producing compounds of formula (I) with a symmetrical structure, i.e. in which A and B are the same, the reaction is best carried out by condensing a dicarboxylic acid of formula (III) or one of its functional derivatives with a compound of formula (VII) or (VIII) in the molar ratio 1:2, i.e. 1 mol of compound (III) and 2 mole of compound (VII) or (VIII), or in a ratio not deviating significantly from this.

For the production of compounds of formula (I) in which A and B are different the condensation reaction can likewise be carried out in a single operation.

Alternatively a dicarboxylic acid of formula (III) or one of its functional derivatives can be condensed with a 1-amino-2-hydroxybenzene of formula (VII) or (VIII) to a para-benzoxazolyl-monophenylenecarboxylic or polyphenylenecarboxylic acid or one of their functional derivatives and this cyclized with a 1-amino-2-hydroxybenzene of formula (VIII) or (VII) to a compound of formula (I). The three reactants (a dicarboxylic acid of formula (III), a 1-amino-2-hydroxybenzene of formula (VII) and a 1-amino-2-hydroxybenzene of formula (VIII)) are employed in the molar ratio of 1:1:1 or in a ratio differing only slightly from this.

In the reaction of dicarboxylic acids of formula (III) with 2-amino-1-hydroxybenzenes of formula (VII) and/or (VIII) it is probable that acyl derivatives of the 2-amino-1-hydroxybenzenes such as esters and/or amides are invariably formed in the first stage. The reactants and the reaction conditions can be chosen so that these esters and/or amides are isolated and cyclized in a second stage to compounds of formula (I).

If acylation and cyclizing are carried out as two separate steps, in the first step a solvent with a boiling range of 80°–150°C can be used, e.g. benzene, toluene, xylene, chlorobenzene or bromobenzene. These intermediates do not need to be isolated, i.e. the reaction conditions are preferably chosen so that acylation and ring closure take place as a single operation. For this reaction it is preferable to use the previously named phosphoric acids.

The triazolated ortho-aminophenols of formulae (VII) and (VIII) used as starting materials can be produced by known methods, namely reduction of the corresponding triazolated ortho-nitrophenols of formulae (IV) or (V), e.g. with catalytically activated hydrogen or sodium dithionite, in alkaline medium.

The reaction of a dicarboxylic acid of formula (III) or one of its functional derivatives with an ortho-aminohalogenobenzene of formula (IX) and an ortho-aminohalogenobenzene of formula (X) leads first to a diamide of formula

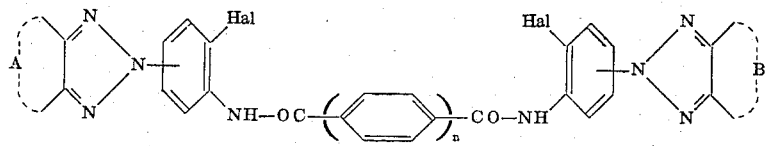

(XIII)

This acylation reaction is carried out under the same conditions as the acylation of the ortho-aminophenols of formulae (VII) and (VIII).

The cyclizing reaction to bis-triazole compounds of formula (I) is carried out in the presence of copper or a copper compound, advantageously at temperatures from 100° to 200°C, preferably in a liquid medium, optionally in the presence of an acid-binding agent.

The copper catalyst may be a commercial grade of copper powder, but it is preferably a finely divided product obtained by the reaction of metallic lead or zinc with a copper (II) compound such as copper (II) acetate, chloride or sulphate.

The suitable copper compounds are copper (II) compounds, e.g. copper (II) oxide, chloride, bromide, acetate and sulphate and copper (I) compounds e.g. copper (I) chloride. As suitable reaction media may be named inert organic solvents, e.g. hydrocarbons, halogenated and nitrated hydrocarbons, petroleum fractions of high boiling point, xylene mixtures, chlorobenzene, ortho-dichlorobenzene, trichlorobenzene, nitrobenzene, bromobenzene, naphthalene, tetrahydronaphthalene, decahydronaphthalene, diphenyl, diphenyl oxide, ethers [e.g. methoxybenzene, ethoxybenzene, bis-(2-ethoxyethyl)-ether, bis-(n-butoxyethyl)-ether, bis- (2-(2'-methoxyethoxy)-ethyl)-ether, bis-(2-(2'-ethoxyethoxy)-ethyl)-ether, bis-(2-(2'-n-butoxyethoxy)-ethyl)-ether], amides [e.g. dimethyl formamide, dimethyl acetamide, phosphoric acid tris-(dimethylamide)], and sulphones (e.g. tetramethylene sulphone).

The preferred acid-binding agents for neutralizing the liberated hydrogen chloride or bromide are the alkali-metal salts of weak organic and inorganic acids, such as sodium and potassium acetate, sodium and potassium carbonate, and in particular amines, notably aliphatic amines e.g. n-butylamine, di-(n-butyl)-amine, tri-(n-butyl)-amine and triethylamine, aliphatic-aromatic amines e.g. dimethylaminobenzene and diethylaminobenzene, or heterocyclic amines e.g. pyridine, quinoline and mixtures of pyridine bases, and the picolines and lutidines. If the tertiary amines are used in great excess they can serve both as reaction media and as acid-binding agents.

The reaction can however be carried out in the absence of an acid-binding agent or with a complex salt, for instance the salt of a copper compound and ammonia or pyridine, e.g. a cupric ammonium acetate or cupric pyridinium sulphate.

If an inorganic acid-binding agent is used or no acid-binding agent is present, cyclization takes place at temperatures from 150° to 200°C, whereas in the presence of a basic organic substance such as pyridine temperatures in the range of 100° to 150°C are suitable.

The metals suitable for the reaction with the triazole compounds of formulae (XI) and (XII) include sodium, potassium, magnesium, silver and copper, the last-named being preferred. They are used in finely divided form, e.g. as powders. Magnesium, which reacts readily with the aryl halides, can be employed in powder form or as chips. The reaction with copper can be carried out advantageously in the range of 200°–300°C, preferably at 200°–260°C when Hal stands for iodine and preferably at 240°–280°C when Hal stands for bromine. It is of advantage to work in the melt in the absence of solvent, but if necessary the melt can be diluted with an inert solvent e.g. one of those used for cyclization, in particular a mineral oil or ether of high boiling point, e.g. di-n-octylether, di-(2-ethylhexyl)-ether, dibenzylether, preferably diphenylether, or a mixture of 73 % diphenyl ether and 27 % diphenyl, or alternatively pure dry sand can be added to the melt. The condensation reaction is usually carried out at normal pressure with mechanical stirring of the melt.

The most suitable condensing agent is metallic copper. Its effectiveness can be increased by adding a trace of mercury or by treatment with iodine (cf. Kleiderer, J. American Chemical Society 55, 4225 (1933)). The copper is used preferably in excess, e.g. in two to five times the theoretical amount. The reaction times range from 2 to 20 hours, the optimal times being 5 to 10 hours.

The reaction with silver is carried out in the same way. If sodium or potassium is used it is best to react at high temperatures in the presence of one of the aforenamed inert solvents or diluents.

For the reaction with magnesium it is advisable to convert the two compounds of formulae (XI) and (XII) into the magnesium halide derivatives first. This is accomplished in an inert solvent free from water and from acid, for example an ether, e.g. diethyl ether, diisopropyl ether, diisoamyl ether, di-n-butyl ether; a tertiary amine, e.g. pyridine, quinoline, N,N-dimethylaminobenzene or N,N-diethylaminobenzene; or a hydrocarbon, e.g. benzene or toluene, preferably in admixture with an ether or a tertiary amine.

The addition of iodine in catalytic amounts or iodine-activated magnesium at the outset of the reaction considerably shortens the induction time. In place of pure magnesium, a magnesium alloy, e.g. a copper-magnesium alloy, can be used. The best temperature range for this reaction is −10° to 100°C, preferably 0° to 50°C.

The subsequent addition of an anhydrous silver or copper halide, preferably AgCl, AgBr, CuCl$_2$ or CuBr$_2$, decomposes the magnesium halide compounds with separation of metallic silver or copper (I) halide and formation of a direct linkage between the terminal phenyl nuclei according to the scheme R$_1$-Mg-Br + Br-Mg-R$_2$ + 2AgBr → R$_1$-R$_2$ + 2MgBr$_2$ + 2Ag or R$_1$-Mg-Br + Br-Mg-R$_2$ + 2CuCl$_2$ → R$_1$-R$_2$ + 2MgBrCl + Cu$_2$Cl$_2$, where R$_1$ and R$_2$ represent aryl radicals such as phenyl or naphthyl radicals. The temperature range is as given above for the formation of the magnesium halide compounds.

The triazole compounds of formula (I) can be isolated in various ways, for example by filtration with suction, by partial distillation of the solvent in vacuum, on which the product is allowed to crystallize, by total elimination of the solvent by vacuum or steam distillation, or by dilution with a suitable solvent such as petroleum ether or a lower alcohol. On isolation the compound of formula (I) is washed if necessary and dried.

The reaction of triazole compounds of formulae (XI) and (XII) with metals yields metal halides which, if they are magnesium halides or copper chloride or bromide, are best removed with water or a dilute acid, and if they are cuprous iodide or a silver halide with a solution of ammonia, an alkali-metal thiosulphate or thiocyanide.

If metal radicals remain in the product or if the reaction has been carried out in the presence of sand, the bis-triazole compounds can be isolated by flotation or extraction with a suitable solvent.

The bis-triazole compounds produced in accordance with this invention are best purified by precipitation from solution in an organic solvent, to which decolourizing carbon, bleaching earth and/or zinc dust can be added as required.

Interesting bis-triazole compounds of formula I) are the symmetrical ones agreeing with formula

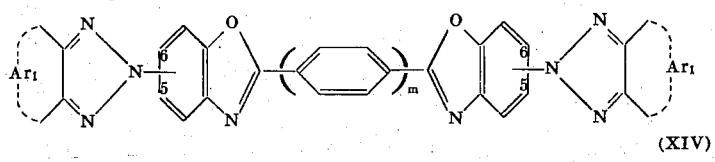

(XIV)

where

represents one of the radicals of formulae

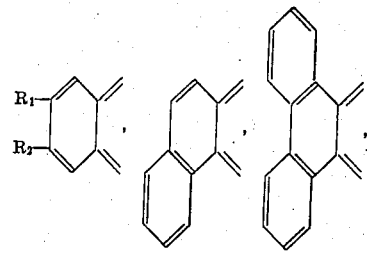

or

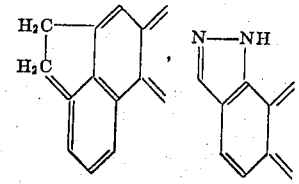

in which
R$_1$ stands for hydrogen or alkyl having 1 to 8 carbon atoms,
R$_2$ for hydrogen or alkoxy having 1 to 8 carbon atoms and $m$ has a value from 1 to 4,
and the radicals

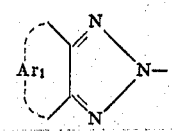

occupy the 5 or 6 positions of the benzoxazole radical.

The $R_1$ and $R_2$ radicals in the meaning of alkyl or alkoxy are preferably linear or only slightly branched (methyl, ethyl, n-butyl, n-octyl, iso-octyl, methoxy, ethoxy, n-butoxy, n-amyloxy, iso-butoxy, iso-amyloxy, n-octyloxy, 2-ethylhexyloxy).

Very interesting products are the compounds of formula (XIV),
where

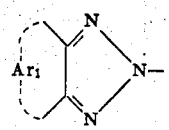

represents

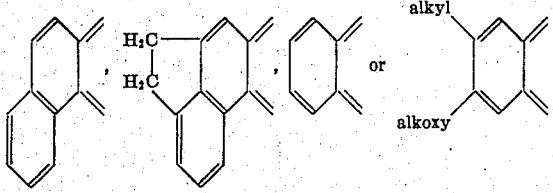

and $m$ has the value 2 or 3,
alkyl and alkoxy contain 1 to 4 carbon atoms and the radicals

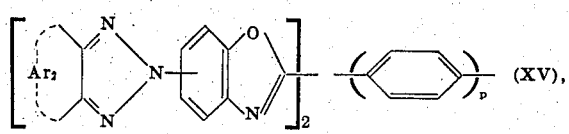

occupy the 5 or 6 positions of the benzoxazole radical.

Especially valuable are the compounds agreeing with the formula $$\left[ Ar_2 \underset{N}{\overset{N}{\diagdown}} N- \underset{N}{\overset{O}{\diagdown}} \right]_2 -\left(\phantom{X}\right)_p \quad (XV),$$

where

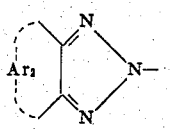

represents

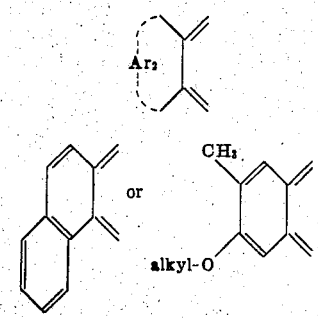

$p$ has the value 2 or 3,
alkyl has 1 to 4 carbon atoms and the radicals occupy the 5 or 6 positions of the benzoxazole radical.

The new bis-triazoles have very little self-colour. They are insoluble in water and soluble in organic solvents such as chlorobenzene, ortho-dichlorobenzene, dimethyl formamide, dimethyl acetamide and 2-ethoxyethanol, in which they exhibit intense violet-blue to greenish blue flourescence.

These compounds are eminently suitable for use as optical brightening agents in colourless or lightly coloured organic materials, e.g. polyesters, polyamides, polyurethanes, polystyrene, polyacrylonitrile, polyvinyl chloride, polyvinylidene chloride, polyolefins such as polyethylene and polypropylene, copolymers of these polymers, cellulose acetate and cellulose triacetate, which may be processed in the form of fibres, film, sheeting, or moulded products. Further, the compounds are suitable for the optical brightening of natural polyamides, fats, oils, waxes, lacquers, resins and cosmetic products. They can also be used for marking these materials or as scintillators.

The compounds can be incorporated with good success in spinning solutions and melts and in plastics moulding materials by melting or dissolving and in the monomers or prepolymers for fibres and plastics.

Further, the compounds are applicable from organic solvent medium, for instance in dry cleaning, e.g. with the aid of an emulsion of an organic solvent or a carrier in which they are in solution. They can be applied to polyester and polyester blend fabrics by the pad-thermofix process, which comprises padding the fabric with an aqueous dispersion of the optical brightener, mechanical extraction of the excess, intermediate drying, and fixation of the optical brightener in dry heat at 180°–230°C.

As the compounds produced in accordance with this invention are highly stable to oxidation, they can be employed with notable success in chemical bleaching, where they are added to the bleach bath in dispersed form, if necessary in conjunction with a carrier.

Depending on the method of application, these new optical brighteners are employed in amounts ranging from 0.001 to 0.5 %, preferably 0.02 to 0.2 %, relative to the weight of the substrate for brightening.

Benzoxazole derivatives substituted by 1,2,3-triazole radicals have been known for a considerable time and their use as optical brightening agents for organic substrates has been suggested. But 1,2,3-triazole derivatives of bis-benzoxazolyl benzene and bis-benzoxazolyl-oligophenylenes, as are obtainable by the process disclosed here, have not as yet been known.

In relation to the 1,2,3-triazole derivatives of bis-benzoxazolyl-ethylene described in French Patent 1,172,134, the compounds of this invention show a considerably higher level of effectiveness. In stability to heat and oxidation they are clearly superior to the said ethylene derivatives, and thus represent an advance in the state of the art. Furthermore, it has been unexpectedly found that the replacement of the ethylene double bond by a 1,4-phenylene radical or by two to six phenylene radicals bound together in the 1,4 positions, as are present in the disclosed compounds, does not affect the shade of the fluorscence to a significant degree. This finding was not predictable since a lengthening of the conjugation generally shifts the shade of the fluorescence in the direction of longer wavelength, i.e. to green. The compounds conforming to this invention produce optical brightening effects of violet-blue to neutral blue shade which show excellent fastness to light, washing and sublimation.

These new compounds are especially valuable for brightening polyester fibres of the polyglycol terephthalate type such as "Terylene" and "Dacron" (registered trade marks) and polyolefin fibres of the polypropylene type such as "Meraklon" (registered trade mark). It has been found that when they are applied in the spinning melts of these materials, the spun filament exhibits pronounced brightness.

In the following Examples the parts and percentages are by weight and the temperatures are in degrees centigrade.

EXAMPLE 1

Approximately 40 parts of hydrogen chloride are directed at about 120° into a fine suspension of 34.2 parts of 1,4-bis-(6'-aminobenzoxazolyl-2')-benzene in 465 parts of 2-ethoxyethanol with the aid of a vibratory stirrer and in the presence of 85 parts of siliquartzit beads. An ultrafine suspension of the dihydrochloride is formed. After cooling to 10° 500 parts of ice are added, followed by a solution of 15 parts of sodium nitrite in 30 parts of water, the temperature being kept below 5° during the addition. The mixture is stirred for 4 to 5 hours at 5°–10°, then the excess nitrous acid is decomposed with dilute sulphamic acid solution. A solution of 44.6 parts of 2-aminonaphthalene-1-sulphonic acid and 9.5 parts of sodium hydroxide in 200 parts of water is added to the homogeneous yellow tetrazo suspension at 8°, the temperature increased to 50°–60° and the coupling reaction carried through to the end-point in 1 hour. During the reaction the pH is maintained at about 4 by adding about 90 parts of cyrstallized sodium acetate. The bis-ortho-aminoazo compound formed is filtered off with the quartzide beads, washed with water, then with 1 % ammonium hydroxide solution and again with water.

The moist filter cake is suspended in 1250–1300 parts of pyridine at 75° for oxidation. At this temperature about 50 parts of crystallized copper acetate are entered in 30 minutes with stirring. After continued stirring for several hours with heating and reflux the compound is no longer indicated and the mixture is allowed to cool. The product settles out and is separated, washed with a 1:1 pyridine-water mixture, then with dilute hydrochloric acid and finally with water, and dried.

The crude 1,4-bis-[6'-naphthotriazolyl-(2")-benzoxazolyl-2']-benzene of formula

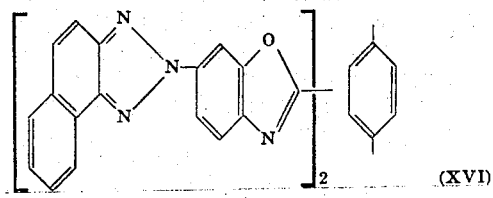

(XVI)

is obtained in good yield in the form of a greenish brown powder. It is purified by recrystallization from solution in trichlorobenzene containing decolourizing carbon, bleaching earth and a small amount of zinc dust, with simultaneous removal of the quartzite beads. In the purified form it is a pale yellow crystalline powder with melting point 360°.

If the 44.6 parts of 2-aminonaphthalene-1-sulphonic acid are replaced by other coupling components, for instance 27.4 parts of 1-amino-4-methyl-5-methoxybenzene, 35.8 parts of 1-amino-4-methyl-5-n-butoxybenzene, 42.0 parts of 2-phenyl-5(6)-aminobenzotriazole, 26.6 parts of 6-aminoindazole, 33.8 parts of 4-aminoacenaphthene or 38.6 parts of 9-aminophenanthrene in the form of a solution in pyridine, and the coupling reaction is carried out in the pH region of 2 to 4, first at 5°–10° and towards the end at 50°–60°, or if the diazo component is changed to 1,4-bis-(5'-aminobenzoxazolyl-2')-benzene or 4,4'-bis-(5"-aminobenzoxazolyl-2")-diphenyl, and the procedure of Example 1 is employed, compounds having very similar properties are obtained which agree with the formula

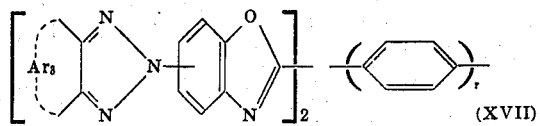

(XVII)

TABLE 1

| Brightener number | $Ar_3$ | $Ar_3$ (with N ring) | Position of the radical $r$ | Fluorescence shade in trichlorobenzene |
|---|---|---|---|---|
| 1 | CH₃—, CH₃O— (benzene) | | 6 | 1 Blue. |
| 2 | Same as above | | 5 | 1 Blueviolet. |
| 3 | do | | 6 | 2 Violet. |
| 4 | CH₃—, n-C₄H₉O— (benzene) | | 5 | 1 Blueviolet. |
| 5 | Same as above | | 6 | 1 Blue. |
| 6 | do | | 6 | 2 Violet. |
| 7 | (naphthalene) | | 5 | 1 Blueviolet. |

TABLE 1—Continued

| Brightener number | Position of the radical Ar₃-(ring) | Ar₃-(triazole N=N-N) | r | Fluorescence shade in trichlorobenzene |
|---|---|---|---|---|
| 8 | Same as above | | 6 | 2 Violet. |
| 9 | do | | 5 | 2 Do. |
| 10 | | (N-phenyl-benzotriazole structure) | 5 | 1 Blueviolet. |
| 11 | Same as above | | 6 | 1 Blue. |
| 12 | | (N—NH indazole structure) | 6 | 1 Do. |
| 13 | Same as above | | 5 | 1 Blueviolet. |
| 14 | (CH₂-CH₂ acenaphthylene structure) | | 5 | 1 Do. |
| 15 | Same as above | | 6 | 1 Blue. |
| 16 | do | | 6 | 2 Violet. |
| 17 | | (phenanthrene structure) | 5 | 1 Blueviolet. |
| 18 | Same as above | | 6 | 1 Green-blue. |

EXAMPLE 2

A warm solution of 20.3 parts of terephthaloyl chloride in 79 parts of 1,2-dichlorobenzene is dropped into a suspension of 68.4 parts of 2-nitro-5-(5'-methyl-6'-butoxybenzotriazolyl-2')-phenol. The mixture is stirred for 6 hours at 120°–130° until very little further hydrogen chloride is formed, on which it is allowed to cool. The condensation product is isolated by filtration, washed with chlorobenzene and dried. It has the formula

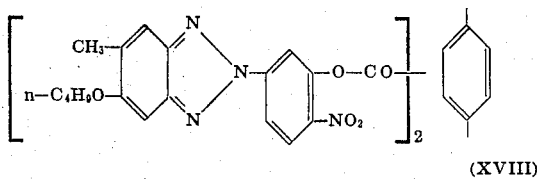

(XVIII)

40.7 Parts of the compound of formula (XVIII) are entered in small portions in the space of one hour into a solution of 135 parts of stannous chloride (SnCl₂·2H₂O), 250 parts of 36 % hydrochloric acid and 900 parts of 2-ethoxyethanol at 70°–80°. Stirring is continued for 3 hours at 120°–130°, then the pale brown suspension is allowed to cool. 3600 Parts of 10 % sodium hydroxide solution are added, on which the compound No. 5 of Table 1 settles out in the form of brown crystals. It is recrystallized twice from trichlorobenzene solution, on which it is obtained as a fine powder of pale yellow colour.

The triazolated ortho-nitrophenols of formula (IV) or (V) used as starting materials in this Example and in the Examples of Table 2 can be produced as follows. A warm solution of 31 parts of 3-amino-6-nitrophenol in 71 parts of 36 % hydrochloric acid and 60 parts of water is prepared, run into 160 parts of ice and diazotized at 5°–10° with a solution of 14 parts of sodium nitrite in 30 parts of water. A solution of 35.9 parts of 1-amino-4-methyl-5-n-butoxybenzene in 100 parts of pyridine is added to the diazo solution at 5°–8°, the pH is adjusted to about 4 with sodium acetate and the temperature raised to 50°–60°. The orthoaminoazo compound thus formed is isolated by filtration and washed with water until neutral. The moist filter cake is added in portions to a boiling solution of 200 parts of pyridine, 100 parts of water and 50 parts of crystallized copper sulphate, with stirring and reflux. Air is driven into the mixture for 6 to 8 hours until the starting compound is no longer indicated. After cooling and dilution with water the product, 2-nitro-5-(5'-methyl-6'-butoxybenzotriazolyl-2')-phenol, settles out. It is filtered with suction and washed thoroughly with water, dilute hydrochloric acid, and again with water. It can be purified by dissolving in dilute sodium hydroxide solution and precipitation with dilute hydrochloric acid.

The diazo solution obtained from 31 parts of 3-amino-6-nitrophenol as above can be reacted with
a. 27.4 parts of 1-amino-4-methyl-5-methoxybenzene,
b. 28.6 parts of 2-napthylamine or
c. 21.6 parts of 1,3-diaminobenzene
and the resulting ortho-aminoazo compounds oxidized as given in this Example, which yields respectively the following compounds:
A. 2-nitro-5-(5'-methyl-6'-methoxybenzotriazolyl-2')-phenol,
B. 2-nitro-5-(naphthotriazolyl-2')-phenol or
C. 2-nitro-5-(5',6'-aminobenzotriazolyl-2')-phenol.

To eliminate the amino group 27.1 parts of the compound (C) are dissolved in diemthyl formamide, and after the addition of water, ice and 24.5 parts of 36 % hydrochloric acid diazotized at 0°-5° with 7 parts of sodium nitrite. After stirring for about 1 hour at this temperature the diazonium chloride is quantitatively precipitated with sodium chloride and suction filtered at 0°. The moist diazonium salt is entered in portions with stirring into 1000 parts of boiling alcohol and the mixture is heated further until the diazo reaction is negative. When the mixture has cooled the 2-nitro-5-(benzotriazolyl-2')-phenol is filtered and purified by precipitation as described above.

benzene and dried.

48.2 Parts of the compound thus formed are added in small portions in about one hour to a solution of 130 parts of tin (II) chloride, 240 parts of 36 % hydrochloric acid and 460 parts of 2-ethoxyethanol at 70°-80° with stirring. After stirring for 3 hours at 120°-130° the pale brown suspension is allowed to cool to 0° and 3450 parts of a 10 % sodium hydroxide solution is 0° are added. The precipitated compound is filtered with suction at 0°, washed with water and dried. The 2-(4'-ethoxycarbonylphenyl)-6-(naphthotriazolyl-2'')-benzoxazole of formula

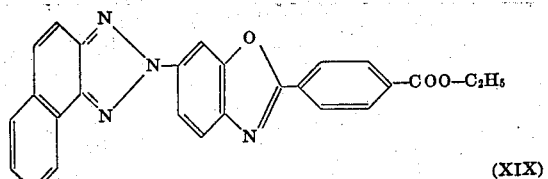

(XIX)

is obtained in good yield.

21.7 parts of the compound of formula (XIX) are suspended in 210 parts of 2-ethoxyethanol, a solution of 4 parts of sodium hydroxide in 12 parts of water is added and the mixture reacted at the boil for 6–8 hours with reflux. It is then cooled, diluted with 800 parts of water, acidified with hydrochloric acid, and the precipitated product filtered with suction, washed with water and dried. The corresponding carboxylic acid is obtained as a pale powder which requires no additional purification.

20.3 Parts of this acid and 80 parts of thionyl chloride are boiled with reflux for about 4 hours, after which very little further hydrogen chloride is developed. The excess thionyl chloride is distilled in vacuum. 12.8 Parts of 2-nitro-5-(benzotriazolyl-2')-phenol and 130 parts of pyridine are added and the mixture is stirred for 4 hours at the boil. After cooling to room temperature it is discharged into an ice and water mixture and the precipitated product is filtered, washed well with water and dried. The compound of formula

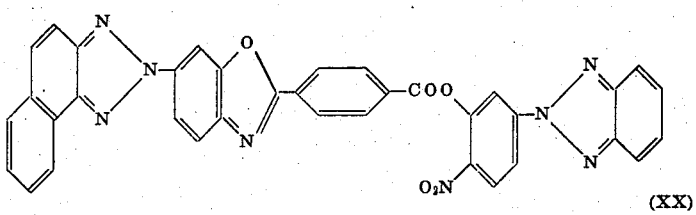

(XX)

EXAMPLE 3

30.6 Parts of 2-nitro-5-(naphthotriazolyl-2')-phenol and 21.3 parts of terephthalic acid monoethylester chloride are added to 340 parts of 1,2-dichlorobenzene and reacted for 6 hours at 120°-130° with stirring in the absence of moisture, until formation of hydrogen chloride falls to a minimum. On cooling, the condensation product is filtered with suction, washed with chlorois obtained in good yield. Without additional purification, 16.1 parts of this compound are added in portions in about 30 minutes to a solution of 32.5 parts of tin (II) chloride in glacial acetic acid (340 parts) saturated with hydrogen chloride. The mixture is stirred for 5 hours at 80° and then boiled for 2 hours with reflux. After this time no further starting material is indicated. The mixture is cooled and the precipitated product of formula

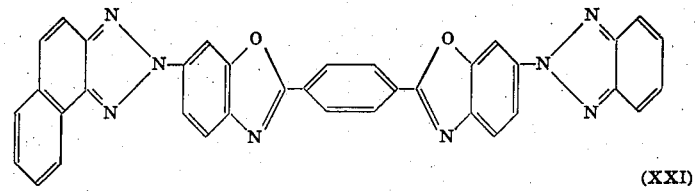

(XXI)

filtered with suction, washed with ample water, dried, and purified by crystallization from trichlorobenzene with the aid of bleaching earth and a small amount of zinc dust. It is a pale yellow, finely crystalline powder with melting point >360°.

If, in place of the 12,8 parts of 2-nitro-5-(benzotriazolyl-2')-phenol used above, this Example is practised with 15 parts of 2-nitro-5-(5'-methyl-6'-methoxybenzotriazolyl-2')-phenol or 17.1 parts of 2-nitro-5-(5'-methyl-6'-butoxybenzotriazolyl-2')-phenol, it results in asymmetrical compounds of formula

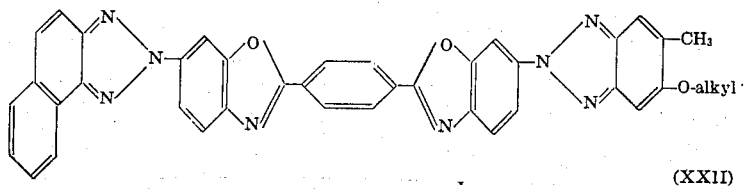

in which alkyl stands for methyl or n-butyl.

EXAMPLE 4

A mixture obtained by stirring 14 parts of 1,4'-diphenyldicarboxylic acid chloride and 27 parts of 2-amino-5-(5'-methyl-6'-methoxybenzotriazolyl- 2')-phenol in 300 parts of 1,2,4-trichlorobenzene is raised to 150°–160° under a nitrogen atmosphere in the absence of moisture and reacted for 6 hours at this temperature. After this time the evolution of hydrogen chloride is minimal. The mixture is allowed to cool to room temperature and the precipitated compound is filtered with suction, washed with ample chlorobenzene and dried. The diaryl compound of formula

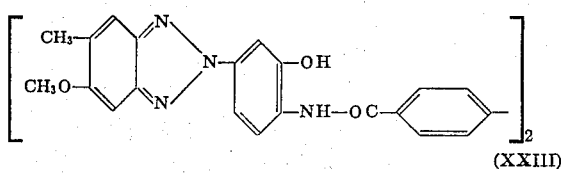

(XXIII)

is obtained in good yield.

22.4 Parts of this compound, which requires no further purification, and 1 part of boric acid are added to 300 parts of dibutyl phthalate. The temperature is raised to 320° in the course of 5 hours in the absence of air, on which ring closure takes place with distillation of the water formed in the reaction. The brown, almost clear solution is held for 30 minutes at this temperature, then it is cooled to 80°, 200 parts of 2-ethoxyethanol are added, and it is cooled further to 10°. The product settles out and is isolated by filtration, washed with methanol and with water, dried, and recrystallized from trichlorobenzene with the addition of decolourizing carbon and bleaching earth. The compound No. 3 of Table 1 is obtained in the form of a pale yellow powder.

The triazolated ortho-aminophenols of formulae (VII) or (VIII) used as starting materials in this Example can be prepared, for example, as follows. A solution of 60 parts of 2-nitro-5-(5'-methyl-6'-methoxybenzotriazolyl-2')-phenol or 68.4 parts of 2-nitro-5-(5'-methyl-6'-butoxybenzotriazolyl-2')-phenol in 530 parts of 10 % sodium hydroxide solution is heated to 70°–75° and 100–150 parts of sodium dithionite are added in portions with vigorous stirring, which decolourizes the initially orange-red solution. The mixture is stirred for 30 minutes at 85°–90°. The pH value is adjusted, if necessary, to about 7 with sodium hydroxide solution or acetic acid. After cooling to about 10° the precipitate is filtered with suction, washed thoroughly with cold water and dried. The product, 2-amino-5-(5'-methyl-6'-methoxybenzotriazolyl-2')-phenol or 2-amino-5-(5'-methyl-6'-butoxybenzotriazolyl-2')-phenol respectively, is obtained in the form of a pale yellow crystalline powder which is sufficiently pure for further use as it is.

EXAMPLE 5

27.6 Parts of 1-amino-2-hydroxy-4-(naphthotriazolyl-2')-benzene and 20 parts of terephthalic acid monomethyl ester chloride are added to 260 parts of 1,2-dichlorobenzene. The mixture is raised to 130° in the course of 5 hours under a nitrogen atmosphere in the absence of moisture, then the temperature is increased to 160° and this temperature maintained for 1 hour. One part of boric acid is added, the temperature raised further to 200°–210° and the reaction continued for 2 hours at this temperature. The greater part of the 1,2-dichlorobenzene is distilled during this time, along with the water formed in the reaction. The reaction mixture is cooled, diluted with 158 parts of methanol and cooled further to room temperature, on which the product settles out. It is filtered with suction, washed with methanol and dried. The 4-[6'-naphthotriazolyl-(2'')-benzoxazolyl-2']-1-benzoic acid methylester of formula

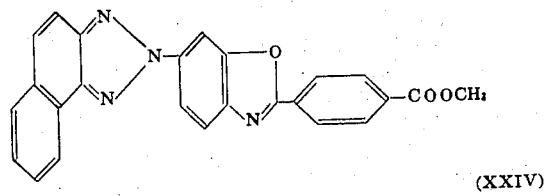

(XXIV)

is obtained in good yield. 21 Parts of this compound are converted into the carboxylic acid chloride via the carboxylic acid by the method described above for the ethylester of formula (XIX). The crude carboxylic acid chloride is set with 11.3 parts of 1-amino-2-hydroxy-4-(benzotriazolyl-2')-benzene and 120 parts of pyridine, and the mixture reacted for 7 hours at the boil in the absence of air. After cooling to room temperature it is run into 1200 parts of ice-water and the precipitated product is filtered with suction, washed thoroughly with water and dried. This compound is of formula

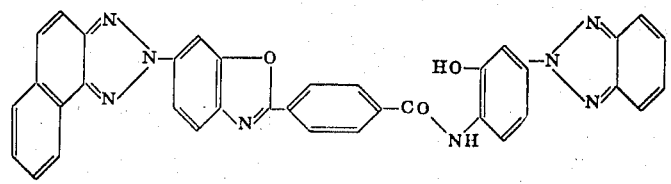

(XXV)

15.4 Parts of the compound thus produced and 0.5 parts of boric acid are stirred into a mixture of 300 parts by volume of bis-(ethoxyethyl)-ether and 75 parts by volume of bis-(n-butoxyethyl)-ether. The mixture is raised to 240° in 4 hours with vigorous stirring in the absence of air, after which it is reacted further for 2 hours at this temperature. The water of reaction is continuously distilled, along with the solvent of lower boiling point.

While the reaction mixture is cooling it is diluted with 300 parts of dimethyl formamide. The product settles out and is isolated by filtration at room temperature, washed with dimethyl formamide and water, dried and recrystallized from solution in trichlorobenzene. The compound of formula (XXI) is obtained.

If the procedure of this Example is employed with 13.5 parts of 1-amino-2-hydroxy-4-(5'-methyl-6'-methoxybenzotriazolyl-2')-benzene or 15.6 parts of 1-amino-2-hydroxy-4-(5'-methyl-6'-n-butoxy-benzotriazolyl-2')-benzene instead of 11.3 parts of 1-amino-2-hydroxy-4-(benzotriazolyl-2')-benzene, the products are asymmetrical compounds of formula (XXII) in which alkyl stands for methyl or n-butyl respectively.

EXAMPLE 6

27.6 Parts of 1-amino-2-hydroxy-4-(naphthotriazolyl-2')-benzene and 12.1 parts of 1,4'-diphenyldicarboxylic acid are entered in the given order with vigorous stirring into 400 parts of polyphosphoric acid of 83 % phosphorus pentoxide content heated to 50°–60°. The mixture is raised in 1 hour to 150° in the absence of air and moisture, held at this temperature for 2 hours and then reacted further for 8 hours at 210°–220° with continued stirring.

A dark brown melt is formed which contains no further starting material. After it has cooled to about 100° it is carefully diluted with 500 parts of ice-water and then stirred for about 1 hour at room temperature. The homogeneous suspension is stirred into 1500 parts of ice-water causing the product to settle out. It is washed consecutively with water, 10 % sodium carbonate solution, and water, dried and recrystallized from trichlorobenzene solution with the addition of bleaching earth and some zinc dust. Compound No. 8 of Table 1 is obtained as a pale yellow powder which melts at above 360°.

The triazolated ortho-aminophenols of formulae (VII) or (VIII) used as starting materials in this Example can be produced in analogy with the procedure of Example 4 by reduction of the corresponding ortho-nitrophenol derivatives of formulae (IV) or (V) with sodium dithionite in alkaline-aqueous medium.

EXAMPLE 7

9.8 Parts of the compound of formula

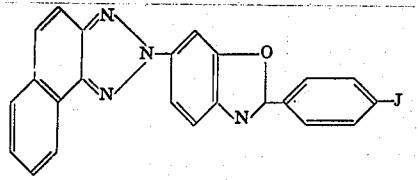

(XXVI)

are stirred into 10 parts of a mixture of 73 % diphenyl oxide and 27 % diphenyl, then 2.3 parts of activated copper powder are added in portions to the suspension at 180°. 0,4 Parts of mercury are added and the temperature of the mixture increased to 250° in the space of 3 hours. The melt formed is maintained at this temperature for 5 hours with vigorous stirring, after which time it takes on the form of a viscous dark brown paste in which no further starting material is indicated. 50 Parts of 1,2,4-trichlorobenzene are added at about 200°. As the mixture cools the yellow crystalline product settles out. It is isolated by filtration with suction and freed from admixed copper by recrystallization from trichlorobenzene. The compound No. 8 of Table 1 is obtained in the form of a finely crystalline powder of pale yellow colour. Its melting point is above 360°.

The compounds of formulae (XI) or (XII) employed as starting materials in this Example and the Examples of Table 2 can be formed from the corresponding triazolated ortho-aminophenols of formulae (VII) or (VIII) (cf. Example 4 ) by the following method. A mixture of 27.6 parts of 1-amino-2-hydroxy-4-(naphthotriazolyl-2')-benzene or 22.6 parts of 1-amino-2-hydroxy-4-(benzotriazolyl-2')-benzene, 24.8 parts of 4-iodobenzoic acid, 1.5 parts of boric acid, 7.9 parts of pyridine and 85 parts of 1,2,4-trichlorobenzene is raised to 170° in about 30 minutes in the absence of atmospheric oxygen and with vigorous stirring. The mixture is stirred further for 2½ hours at 170°–175°, with distillation of the greater part of the pyridine. Subsequently it is held for 2½ hours at 190° and for a further 2½ hours at 215°–220° with weak reflux, following which a practically clear solution of dark brown colour is formed. On cooling the precipitated product is filtered with suction, washed thoroughly with cold chlorobenzene and dried. The iodated compounds are obtained in good yield as grey-brown crystalline powders which can be reacted further without special purification.

The 24.8 parts of 4-iodobenzoic acid used in the above operating procedure can be replaced by 32.4 parts of 4'-iododiphenyl-4-carboxylic acid and the amount of 1,2,4-trichlorobenzene increased to 120 parts, the procedure remaining in other respects the same. Other isolated intermediates for the synthesis of quater-phenyl derivatives are obtainable in this way.

EXAMPLE 8

A suspension of 10.7 parts of 1-amino-2-bromo-4-[naphthotriazolyl-(2')]-benzene (amino content 95.5 %) in 100 parts of dimethyl acetamide is prepared at 0°. With thorough stirring 3.1 parts of terephthaloyl chloride are entered, with care taken to prevent the temperature from rising to above 10°. After the addition the mixture is stirred for 30 minutes, during which time the temperature increases to 20°–25°. In the next 30 minutes the yellow-brown suspension is raised to 80°. It is held at this temperature for 3 hours, then cooled to about 20° and unloaded into 1000 parts of water. The grey-brown precipitate is filtered with suction, washed with water and dried. The diacyl compound of formula

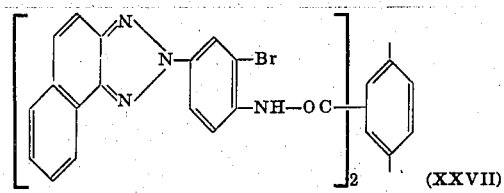

(XXVII)

is obtained in high yield.

In 15 minutes 8.3 parts of this compound are entered with stirring into a solution of 3.2 parts of anhydrous copper sulphate in 166 parts of dimethyl formamide and 12 parts of pyridine maintained at 85°. After the addition of 0.66 parts of zinc dust the suspension is raised to 145° in 30 minutes and reacted at this temperature for 4 hours with stirring and weak reflux. On cooling to 0° the product settles out. It is isolated by filtration, washed with methanol and then with 5 % ammonium hydroxide solution until the filtrate runs clear. After drying, the yellow-brown crude product is purified and at the same time freed from admixed metal by recrystallization from 1,2,4-trichlorobenzene. This procedure results in the compound of formula (XVI) which is obtained in good yield.

The 1-amino-2-bromo-4-(naphthotriazolyl-2′)-benzene used in this Example as starting material can be produced as follos. 43.4 Parts of 1-amino-3-bromo-4-nitrobenzene are dissolved in 71 parts of 36 % hydrochloric acid and 60 parts of water with heating, the solution is run onto 160 parts of ice and diazotized at 5°–10° with a solution of 14 parts of sodium nitrite in 30 parts of water. The diazo solution is set with a solution of 28.6 parts of 2-naphthylamine in 100 parts of pyridine at 5°–8°, the pH adjusted to 3–4 with sodium acetate if necessary and the temperature slowly increased to 50°–60°. The ortho-aminoazo compound formed is filtered with suction and washed until neutral. The moist filter cake is added in portions with stirring to a boiling solution of 200 parts of pyridine, 100 parts of water and 50 parts of crystallized copper sulphate. Air is directed into the mixture for 6 to 8 hours until the starting compound is no longer indicated. On cooling the product is precipitated by dilution with water, filtered with suction, washed thoroughly with water, dilute hydrochloric acid and again with water, and dried. The 1-bromo-2-nitro-5-(naphthotriazolyl-2′)-benzene formed is obtained in good yield in the form of a pale yellow powder which is sufficiently pure for the subsequent reaction.

Hydrogen chloride is directed into a suspension of 90 parts of tin (II) chloride ($SnCl_2 \cdot 2H_2O$) in 300 parts of glacial acetic acid with thorough stirring until a clear solution is formed. In the course of about 2 hours 36.9 parts of the finely pulverized nitro compound are entered in small portions at about 50°. The pale suspension is held at 70°–80° for a further 2–3 hours until reduction is complete. After it has cooled to about 10° the precipitated tin chloride double salt is isolated by filtration and washed free of tin with cold 20 % hydrochloric acid. While still moist it is added in small portions to about 1000 parts of 10 % sodium hydroxide solution at 0°–10° with stirring. The free base settles out and is filtered with suction, washed with cold 10 % sodium hydroxide solution and water, and dried. The 1-amino-2-bromo-4-(naphthotriazolyl-2′)-benzene is obtained as a pale brown powder which does not require any special purification before further use.

Table 2 below gives details of further bis-triazole compounds conforming to this invention, which agree with formula (XVII).

TABLE 2

| Number | Ar₃ | Ar₃ (with triazole) | Position of N— (r) | Produced as in Example | Fluorescence shade in trichlorobenzene |
|---|---|---|---|---|---|
| 1 | (benzene ring) | | 6 | 2, 4, 6 or 7 | Violet. |
| 2 | Same as above | | 6 | 3, 2, 4 or 6 | Do. |
| 3 | do | | 6 | 4, 6 or 7 | Do. |
| 4 | do | | 6 | 1, 2, 4 or 6 | Blue. |
| 5 | do | | 5 | 2, 2, 4 or 6 | Violet. |
| 6 | do | | 5 | 3, 2, 4 or 6 | Redviolet. |
| 7 | (naphthalene ring) | | 6 | 3, 2, 4, 6 or 8 | Violet. |
| 8 | Same as above | | 5 | 3, 2, 4, 6 or 8 | Redviolet. |
| 9 | do | | 6 | 4, 6 or 7 | Violet. |
| 10 | do | | 5 | 2, 2, 4, 6 or 8 | Do. |
| 11 | do | | 6 | 2, 2, 4, 6, 7 or 8 | Do. |
| 12 | do | | 6 | 1, 2 or 4 | Blue. |
| 13 | (dimethyl benzene ring with CH₃, CH₃) | | 6 | 2, 2, 4 or 6 | Violet. |
| 14 | Same as above | | 5 | 3, 2, 4 or 6 | Do. |
| 15 | (H₂C, H₂C fused naphthalene) | | 6 | 2, 2, 4 or 6 | Do. |

TABLE 2—Continued

| Number | Ar₃ | Position of Ar₃ in ring system | r | Produced as in Example | Fluorescence shade in trichlorobenzene |
|---|---|---|---|---|---|
| 16 | Same as above | 6 | 3 | 2, 4, 6 or 8 | Do. |
| 17 | do | 5 | 2 | 2, 4 or 6 | Do. |
| 18 | 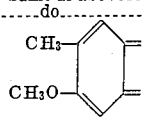 (CH₃, CH₃O-) | 6 | 3 | 2, 4 or 8 | Do. |
| 19 | Same as above | 5 | 3 | 2 or 4 | Redviolet. |
| 20 | do | 5 | 2 | 2, 4 or 8 | Violet. |
| 21 | do | 6 | 2 | 2, 4 or 8 | Do. |
| 22 | do | 6 | 4 | 2, 4 or 7 | Do. |
| 23 | 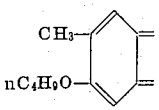 (CH₃, nC₄H₉O-) | 6 | 2 | 2, 4 or 8 | Do. |
| 24 | Same as above | 6 | 3 | 2 or 4 | Do. |
| 25 | do | 5 | 3 | 2 or 4 | Redviolet. |
| 26 | do | 5 | 2 | 2, 4 or 8 | Violet. |
| 27 | 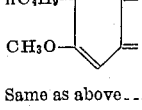 (nC₄H₉, CH₃O-) | 5 | 2 | 2, 4 or 8 | Do. |
| 28 | Same as above | 6 | 2 | 2, 4 or 8 | Do. |
| 29 | 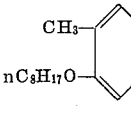 (CH₃, nC₈H₁₇O-) | 6 | 2 | 4 | Do. |
| 30 | Same as above | 5 | 2 | 4 | Do. |
| 31 | do | 6 | 3 | 4 | Do. |
| 32 | 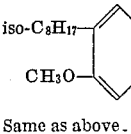 (iso-C₈H₁₇, CH₃O-) | 6 | 2 | 4 | Do. |
| 33 | Same as above | 5 | 2 | 4 | Do. |
| 34 | 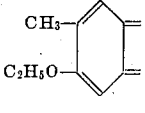 (CH₃, C₂H₅O-) | 5 | 2 | 4 | Do. |
| 35 | Same as above | 6 | 2 | 4 | Do. |
| 36 | 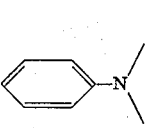 | 6 | 2 | 2,4 or 8 | Do. |
| 37 | Same as above | 6 | 3 | 2 or 4 | Do. |
| 38 | 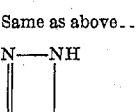 | 6 | 3 | 2 or 4 | Do. |
| 39 | Same as above | 6 | 2 | 2 or 4 | Do. |
| 40 | 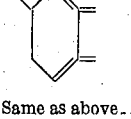 | 5 | 4 | 6 or 7 | Redviolet. |

TABLE 2—Continued

| Number | Ar₃ (structure) | Position of Ar₃\N—N= r | Produced as in Example | Fluorescence shade in trichlorobenzene |
|---|---|---|---|---|
| 41 | (naphthalene structure) | 5 | 4 6 or 7 | Do. |

APPLICATION EXAMPLE A

In a melt spinning machine 200 parts of polyethylene terephthalate are melted at 280° under a nitrogen atmosphere. 0.04 Parts of the compound of formula (XVI) are added, followed by 4 parts of titanium dioxide as delustrant, with continuous stirring to ensure that the additives are homogenously distributed in the melt. The melt is extruded with pressure through the spinneret, the filament cooled with a water jet, cold drawn and reeled in the normal way.

The textiles made with yarns of this filament are considerably whiter in appearance than comparable goods of the same material without the brightener additive.

White effects of similarly good quality are obtained when compound No. 15 or 18 of Table 1 is used in place of the compound of formula (XVI).

APPLICATION EXAMPLE B

A stainless steel autoclave fitted with a stirrer and descending cooler is charged with 1000 parts of dimethyl terephthalate, 665 parts of ethylene glycol, 0.55 parts of manganese acetate, 0.18 parts of antimony trioxide and 0.6 parts of one of the compounds No. 8 of Table 1 or Nos. 1, 2, 3, 7 or 9 of Table 2. The batch is heated and at about 160° cleavage of the methanol begins, which takes 2½ hours to complete, by which time the temperature has increased to about 225°. 4 Parts of titanium dioxide and 0.3 parts of phosphoric acid are added to the melt, the temperature inside the vessel is reduced to below 1 mm and the melt maintained at 290° until the desired degree of polymerization is reached. The polymer thus formed is spun as filament by the normal method at an excess pressure of 2–5 atmospheres (inert gas). The filament is brightened to a high degree of whiteness which is very fast to light and washing.

APPLICATION EXAMPLE C

In a mixer a batch of "Grilon" (registered trade mark) polyamide 6 granules is powdered with 0.01–0.05 % of its weight of compound No. 5 of Table 1. The batch is transferred to a melt spinning machine, melted under nitrogen for 30 minutes at about 300°, the melt stirred at this temperature for 15 minutes and then raised to the spinning temperature, 285°. It is spun as monofilament at an excess pressure of 3–5 atmospheres (nitrogen). The filament exhibits intense blue fluorescence in daylight. The textiles into which it is converted are very much white in appearance than similar textiles of unbrightened material.

In place of compound No. 5 of Table 1, compounds Nos. 2, 7, 10 or 13 of Table 1 or Nos. 4 or 24 of Table 2 can be used, which give comparable white effects.

The stated compounds can be incorporated in polyester and polypropylene melts, which are spun at 290° and 260° respectively, on which filament exhibiting higher whiteness than comparable unbrightened filament are obtained.

APPLICATION EXAMPLE D

A batch of 1000 parts of caprolactam, 30 parts of water and 0.8 parts of compound No. 3 of Table 1 or No. 21 of Table 2 is reacted for 4 hours at 240° in an autoclave under pressure and with stirring, and subsequently for 1 hour with the pressure released. The polyamide melt thus formed is extruded through a slot die, chilled in cold water, cut into chips and dried. The whiteness value of the polyamide chips is considerably higher than that of the same material synthesized without a brightener addition.

The compounds No. 6 of Table 1 or No. 22 of Table 2 can be used for this application with the same success.

APPLICATION EXAMPLE E

In a mixer 200 parts of polypropylene granules are powdered with 0.04 parts of compound No. 4 of Table 2. After processing on a roller mill at 140–200° the polypropylene is either extrusion moulded as panelling or regranulated and injection moulded in the desired form. The moulded products show clearly superior whiteness to comparable products containing no brightener additive.

In place of compound No. 4 of Table 2, one of the compounds of formula (XXI) or (XXII) in which alkyl stands for methyl or n-butyl can be used, the white effects obtained being of similar quality.

Besides polypropylene, this method of application is suitable for high- and low-density polyethylene and other polyolefins.

APPLICATION EXAMPLE F

100 Parts of polyester granules, powdered with 0.02 parts of compound No. 7 of Table 1 in a mixer, are converted into moulded articles on an injection moulding machine. These articles are superior in appearance to comparable polyester mouldings without a brightener compound.

Similar white effects are obtained with polyamide, polystyrene, polyethylene and cellulose acetate by application of the brightener to the material prior to moulding. By replacing the stated compound No. 7 of Table 1 by one of the compounds Nos. 2, 10 or 12 of this table similar white effects are obtained.

APPLICATION EXAMPLE G

One of the compounds of formula (XXI) or (XXII) in which alkyl represents methyl or n-butyl is mised in an amount of 0.01–0.05 parts with 100 parts of moulding material consisting of 65 parts of polyvinyl chloride, 35 parts of a plasticizer such as dioctyl phthalate and 2 %, relative to the polymer, of a stabilizer. The material is processed for 3–6 minutes at 165–185° on a roller mill and converted into film on an extruder. If opaque films are desired 2.5 % titanium dioxide is incorporated in the material before processing.

The films are superior in appearance to comparative films containing no brightener additive.

Formulae of representative optical brighteners of the foregoing Examples are as follows:

The optical brightener No. 8 of Table 1 and of the formula

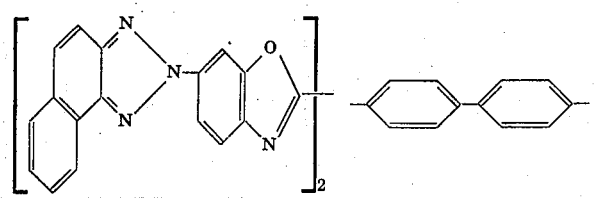

The optical brightener No. 9 of Table 1 and of the formula

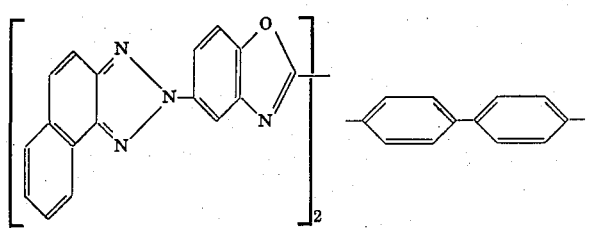

The optical brightener No. 7 of Table 2 and of the formula

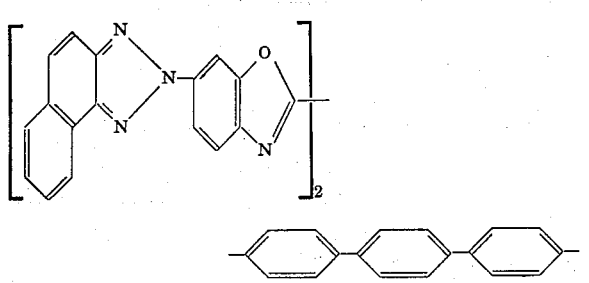

The optical brightener No. 8 of Table 2 and of the formula

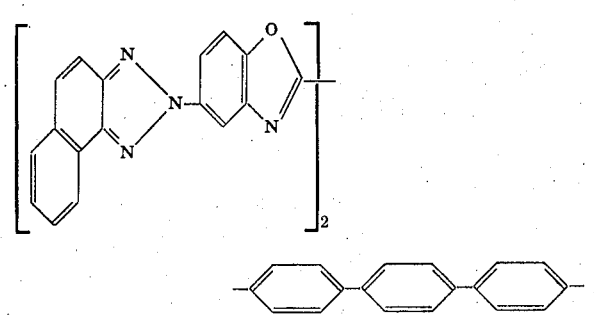

The optical brightener No. 18 of Table 2 and of the formula

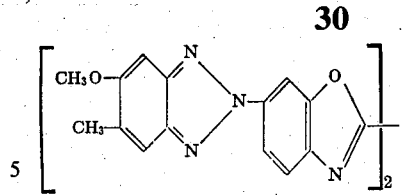

Having thus disclosed the invention what we claim is:

1. A compound of the formula

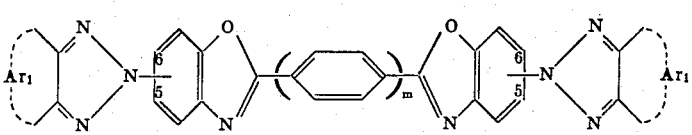

where

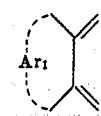

is a radical of the formula

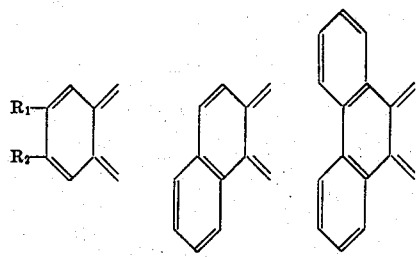

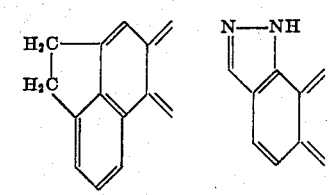

or

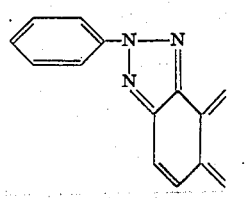

$R_1$ is hydrogen or alkyl which has 1 to 8 carbon atoms,
$R_2$ is hydrogen, alkyl of 1 to 8 carbon atoms, or alkoxy which has 1 to 8 carbon atoms, or $R_1$ and $R_2$ are each methoxy,
and $m$ is a number from 1 to 4,
and where the radicals

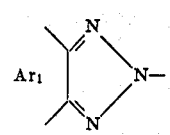

occupy the 5 or 6 positions of the benzoxazole radical.

2. A compound according to claim 1, in which stands for 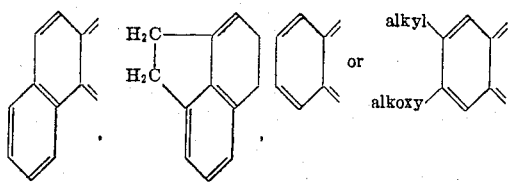

where alkyl and alkoxy have one to four carbon atoms, and in which m has the value 2 or 3 and the radicals

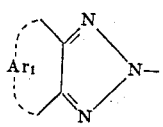

occupy the 5 or 6 positions of the benzoxazole radical.

3. A compound according to claim 2 and of formula

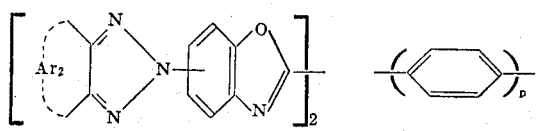

in which stands for 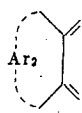

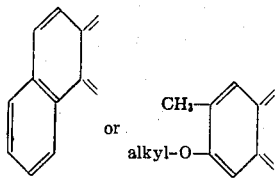

where alkyl has one to four carbon atoms, and in which p has the value 2 or 3 and the radicals

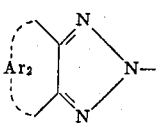

occupy the 5 or 6 positions of the benzoxazole radical.

4. The optical brightener according to claim 1 and of the formula

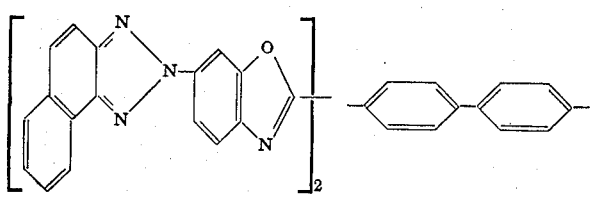

5. The optical brightener according to claim 1 and of the formula

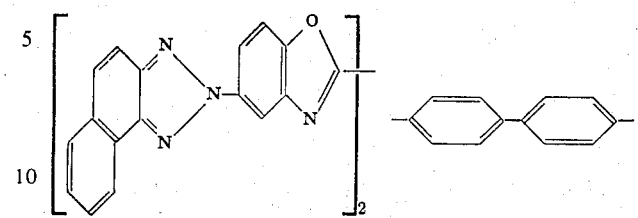

6. The optical brightener according to claim 1 and of the formula

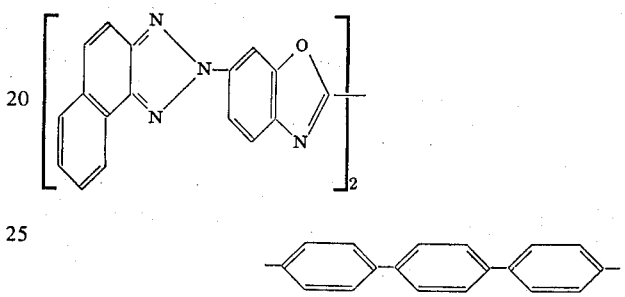

7. The optical brightener according to claim 1 and of the formula

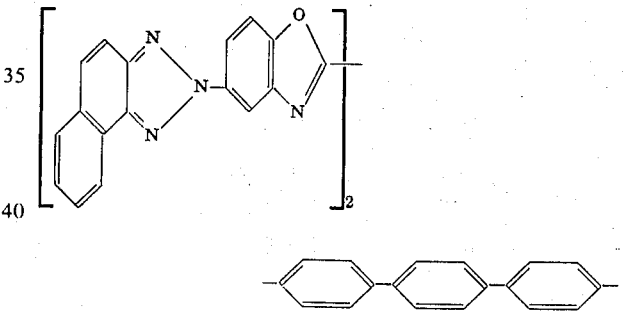

8. The optical brightener according to claim 1 and of the formula

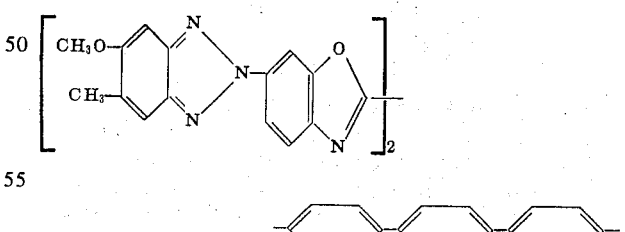

* * * * *